United States Patent [19]

Eisermann

[11] Patent Number: 4,572,347
[45] Date of Patent: Feb. 25, 1986

[54] STOREROOM FOR TRANSPORT CARTS, PARTICULARLY SUPERMARKET SHOPPING CARTS OR THE LIKE

[75] Inventor: Armin Eisermann, Velbert, Fed. Rep. of Germany

[73] Assignee: Schulte-Schlagbaum Aktiengesellschaft, Velbert, Fed. Rep. of Germany

[21] Appl. No.: 658,345

[22] Filed: Oct. 9, 1984

[30] Foreign Application Priority Data

Oct. 3, 1983 [DE] Fed. Rep. of Germany ....... 3336657

[51] Int. Cl.⁴ .............................................. G07F 7/01
[52] U.S. Cl. ...................................... 194/205; 186/62; 194/905
[58] Field of Search .................. 194/4 R, 4 C; 186/27, 186/62; 221/3

[56] References Cited

U.S. PATENT DOCUMENTS 3,882,982  5/1975  Smith ................................. 194/4 C

FOREIGN PATENT DOCUMENTS 2950784  7/1981  Fed. Rep. of Germany .

Primary Examiner—Stanley H. Tollberg
Attorney, Agent, or Firm—Martin A. Farber

[57] ABSTRACT

A storeroom for transport carts, particularly supermarket shopping carts and the like, having removal and return passage barriers, a money collection point for the opening of the passage barrier and a money return point upon the return of the transport cart into the storeroom, a data support associated with the transport cart and a reader for the data in the region of the removal and return passage barriers. Each cart carries its own data code and the reader of the removal passage barrier is coupled with the reader of the return passage barrier such that the reader of the removal passage barrier transmits the individual code of the cart which it has read to the reader of the return passage barrier. The latter releases the return of the money only upon the passage of that transport cart which is provided with that individual code.

7 Claims, 1 Drawing Figure

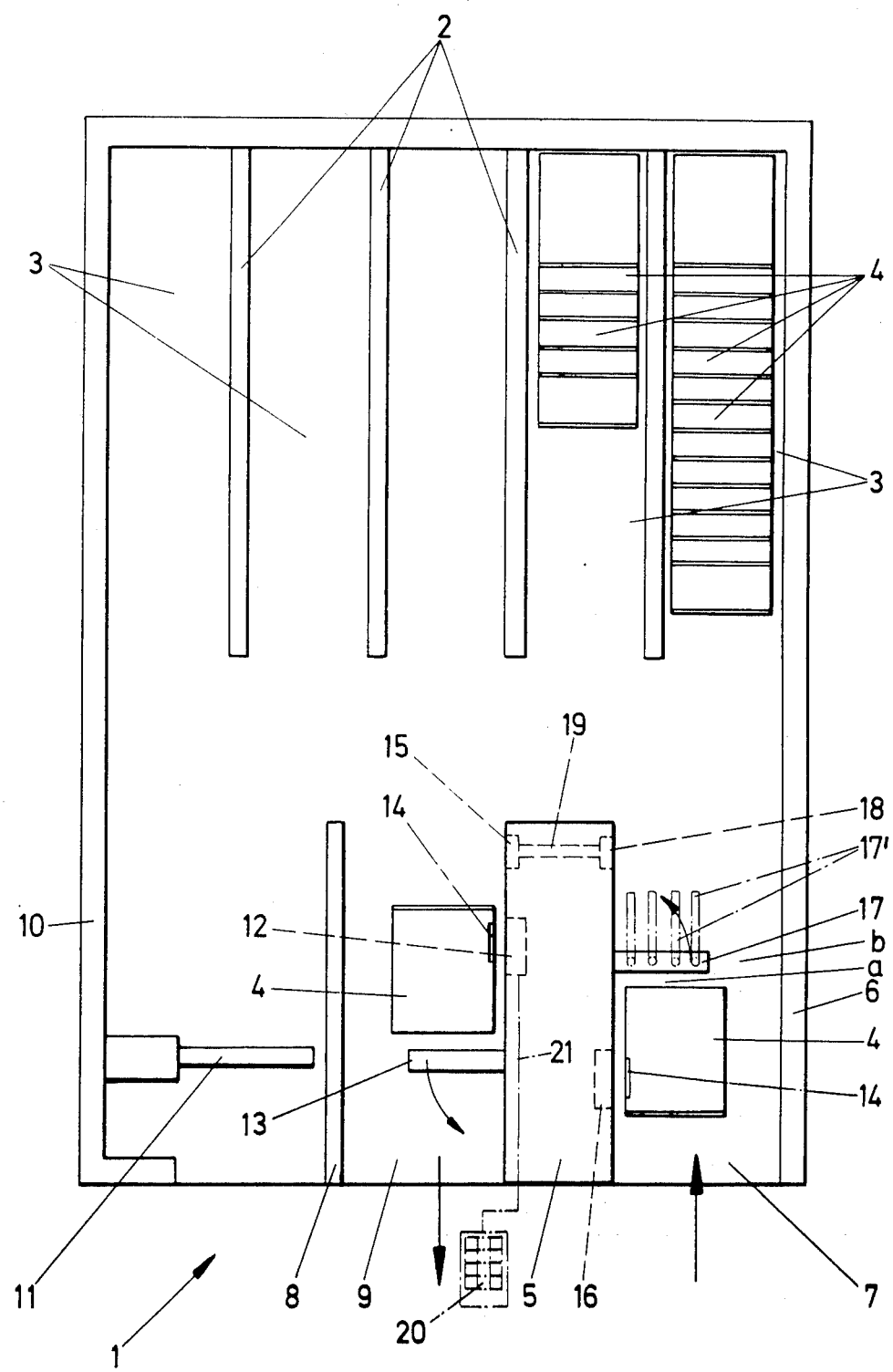

STOREROOM FOR TRANSPORT CARTS, PARTICULARLY SUPERMARKET SHOPPING CARTS OR THE LIKE

BACKGROUND OF THE INVENTION

The present invention relates to a storeroom for transport carts, particularly supermarket shopping carts or the like, with a removal and a return passage barrier, a money collection point for the opening of the passage point and money return point upon the return of the transport cart into the storeroom, and furthermore a data support associated with the transport cart and a reader for said data located in the region of the removal and return passage barrier.

In one known development of this type, the data supports of all carts of a storeroom bear the same code. The removal of a cart requires the insertion of a coin which is returned upon the return of the cart. Such a storeroom operates with reference to a given market. It is therefore not possible to obtain a coin back by means of a cart from another storeroom and a differently coded data support at the money return point upon the return of this cart. However, a possibility for circumvention resides in lifting the transport cart over the removal passage barrier and getting a coin back at the coin return point upon bringing the transport cart back.

In order to prevent the unlawful removal of shopping carts from the storeroom it is known to provide retention rails on the floor which, upon the insertion of the transport cart therein, enter into rear engagement with an engagement member which is seated on a downwardly directed extension of the roller axle (Federal Republic of Germany OS No. 2,950,784). These are strong mechanical locks. Furthermore, the retention rails, which protrude above the floor, are a drawback since one can stumble over them.

SUMMARY OF THE INVENTION

The object of the present invention is to develop a storeroom of the above-indicated type, in a manner which is simple to manufacture and advantageous in use, in such a way that the coin deposited is returned only upon return of the transport cart taken, for which a corresponding coin has been deposited.

In practice of the invention, each cart bears its own data code and the reader of the removal passage barrier is so connected with the reader of the return passage barrier that the reader of the removal passage barrier transmits the individual code of the cart which it has read to the reader of the return passage barrier and the latter releases the return of the money only upon the passage of the transport cart which bears that code.

As a result of this development, there is obtained a storeroom of this type which is of simple construction and increased utility. Strong mechanical locks for the securing of the transport carts can be dispensed with. In order to obtain a cart, the user must deposit the required amount. When the cart passes the reader of the removal passage barrier the individual data code of the transport cart is read, and this code is transmitted to the reader of the return passage barrier.

The removal passage barrier opens and the user can employ the transport cart in the customary manner. After he is finished using the transport cart and returns it to the storeroom, the cart data support passes by the reader of the return passage barrier. Since this reader contains the information that a corresponding coin was paid upon the removal of the transport cart, the money is returned. In this way, assurance is had that a coin is returned only for that transport cart for which a coin was deposited upon its removal. Accordingly, no chicanery can be performed consisting of lifting a transport cart over the removal passage barrier and then receiving a coin upon its return. The storeroom makes it necessary that the transport carts are handled correctly. It is furthermore not possible to return a cart of one storeroom for which, it is true, an amount was paid as deposit, to another storeroom and obtain the return of the coin there.

One advantageous further development resides in the fact that the reader of the removal passage barrier enters into a position of readiness for operation only after the insertion of the coin. The transport cart which is equipped with the individually coded data support accordingly is not yet able, should it pass the reader, to open the removal passage barrier. The amount or coin deposited must namely be paid at the coin insertion point.

It is furthermore advantageous that the return passage barrier is brought into the open position only on reading and independently of agreement with the individual cart code which is read. Therefore, even a transport cart for which no money was paid upon its removal can be brought back into the storeroom. But no coin is then returned.

There is also the possibility that the money collection point be developed as an input keyboard which is physically separated from the removal passage barrier device but electrically connected to it. In such case, the amount of the deposit can also be paid elsewhere, this being communicated via the keyboard to the reader of the removal passage barrier. After the cart has passed the reader of the removal passage barrier the latter then opens.

A regulated supply of money for the return of the carts can be obtained by a coin transport device from the money collection point to the return passage point.

In addition to this, it has been found advantageous for the return passage barrier entry to be developed with two lanes in such a manner that the one lane can be passed over only by the transport cart and the other adjacent lane only by the user. The possibility of circumventing the storeroom is thereby substantially avoided.

In this connection, an arrangement can be used in which hanging bars which can be swung away to one side are associated with the transport lane.

BRIEF DESCRIPTION OF THE DRAWINGS

With the above and other objects and advantages in view, the present invention will become more clearly understood in connection with the detailed description of a preferred embodiment, when considered with the accompanying drawing showing the invention in top plan view.

DETAILED DESCRIPTION OF THE PREFERRED EMBODIMENT

The drawing shows a storeroom 1 in plan view. The side opposite the entrance to the storeroom is divided by a plurality of partitions 2 into narrow chambers 3 of a width somewhat greater than the width of the transport carts, which are stored one behind the other therein.

On the entrance side of the storeroom 1 there is a vending machine column 5. Together with the right-hand wall 6 of the storeroom it forms an entrance 7 while together with a partition 8 extending parallel to the column 5 it forms an exit 9. Between the partition 8 and the left wall 10 of the storeroom there is a barrier 11 for people which can be actuated only by authorized personnel.

In the vicinity of the exit 9, a reader 12 is provided in the vending machine column 5, the reader being arranged in front of a removal passage barrier 13. The reader 12 is located at the height of a data support 14 arranged on the cart 4. The code of the data supports of the carts differs so that each transport cart 4 bears a data code which is specific to it. Furthermore, on the vending machine column 5, at a conveniently reached position, there is a coin insertion place 15 which is so located that when the transport cart 4 has been pushed up to in front of the removal passage barrier 13 the required coin can be introduced in the coin insertion place.

The removal passage barrier 13 is a barrier stile which can be swung into the open position in the direction indicated by the arrow, and it is of such a length that sufficient space remains between its outer end and the partition 8 to permit the passage of a person, but such space is too narrow to permit the transport cart being pushed through it.

The side of the vending machine column 5 which faces the entrance also contains a reader 16 which is coupled to the reader 12 of the removal passage barrier 13. The reader 16 is also located at the height of the data support 14 of the cart. Behind the reader 16 there is a return passage barrier 17 developed in the form of a barrier stile. Between the free end thereof and the wall 6 of the storeroom there is a space which is smaller than the width of the cart 4. However, the space is sufficiently large for a person to pass through the entrance in order to be able to remove a transport cart 4. Behind the return passage barrier 17 there is a coin return point 18. From the coin collection point 15 a coin transport device 19 leads to the return passage point.

The manner of operation is as follows. In order to be able to remove a cart 4 from the storeroom, it is necessary, first of all, to pass through the entrance 7 and take a cart 4 out of one of the rows. The cart is then pushed in the direction toward the exit 9. The necessary coin must now be paid at the coin insertion point 15, as a result of which the reader 12 enters into the ready-for-operation position. When the data support 14 passes the reader 12, the removal passage barrier 13 swings in the direction indicated by the arrow. This condition, however, is not brought about if the cart 4 passes by the reader 12 without a coin having been deposited. The reader 12 advises the reader 16 that the deposit has been paid for this individually coded cart 4. After the cart has been pushed through, the removal passage barrier 13 returns into the blocking position.

After the use of the transport cart 4, it can now be brought back, now passing through the entrance 7. The data support 14 of the cart moves past the reader 16 of the return passage barrier 17. The latter opens, swinging in the direction indicated by the arrow so that the cart 4 can be pushed through. At the same time, the reader 16 forwards the information to the coin return point 18 which returns the coin. After the cart has been pushed through, the return passage barrier 17 moves back into its blocking position.

If a cart 4 has been removed without paying a deposit for it, this accordingly has not been communicated to the reader 16 of the return passage barrier. Then, upon the return of this cart, upon passing by the reader 16 and the return passage barrier 17, no coin will be returned at the coin return point 18.

At the vending machine column 5 there are associated guides (not shown) which see to it that the carts 4 are moved past the readers 12, 16 at a suitable distance away.

The development in accordance with the invention makes it impossible to obtain a refund of a coin at one storeroom for individually coded carts of another storeroom.

The return passage barrier may also consist of a rigid, horizontally aligned bar with which downwardly directed hanging bars 17' are associated. The latter are swingable only in one direction so that upon the insertion of the cart 4 the hanging bars 17' are moved from this position into a withdrawn position; see the showing in dash-dot line.

The return passage-barrier entry 7 is thus developed with two lanes. One lane a can be passed over only by the cart 4 and the other, adjacent lane b only by the user.

By means of an input keyboard 20, indicated in dashed line, which is arranged at a distance from the removal passage barrier device and which forms the coin collection point, remote control can be obtained. The amount of the deposit is paid at the input keyboard 20. Via the keyboard input the information is forwarded to the removal passage barrier reader 12 that the amount has been deposited for a cart of a given number. The removal passage barrier 13 then moves into the open position after the cart has passed by the reader 12.

In this case it is possible to pay the amount of the deposit either at the input keyboard 20 or else at the coin insertion point 15, as described at the beginning.

I claim:

1. In a storeroom for transport carts, having removal and return passage barriers, a money collection point for collecting money for opening of a passage point and a money return point upon the return of a transport cart to the storeroom, a data support coordinated with the transport cart and a reader for said data in the region of the removal and return passage barriers, the improvement wherein each cart carries it individual data code, and
    the reader comprises a removal reader for the removal passage barrier and a return reader for the return passage barrier, said removal reader being operatively coupled with said return reader such that the removal reader transmits the individual data code of the cart which said removal reader has read during removal of said cart from the storeroom to the return reader, and
    the return reader comprises means for releasing a return of the money only upon the return of that transport cart which is provided with said transmitted individual data code.

2. The storeroom according to claim 1, wherein
    the removal reader comprises means for entering into a condition of readiness for operation only after insertion of money at the money collection point, said removal reader cooperates with said removal passage barrier for opening the latter constituting the opening of said passage point upon reading of said data code on said transport cart when said removal reader is in said condition of readiness for operation.

3. The storeroom according to claim 1, wherein the return passage barrier comprises means for moving into an open position permitting passage of a returning cart into the storeroom solely upon said return reader reading an individual data code on said returning cart regardless of correspondence with the individual data code of said returning cart having been previously transmitted to said return reader by said removal reader.

4. The storeroom according to claim 1, wherein said money collection point comprises an input keyboard which is at a distance from the removal passage barrier but electrically connected therewith.

5. the storeroom according to claim 1, further comprising
a coin transport device coupled between the money collection point and the return point.

6. The storeroom according to claim 1, further comprising
a return passage barrier entrance having two lanes, wherein one lane is passable only by the transport cart and said return passage barrier is located in said one lane, and another adjacent of said two lanes is passable only by a user of the cart.

7. The storeroom according to claim 6, wherein said return passage barrier comprises a substantially horizontal rigid bar and hanging bars on said rigid bar swingable away towards a direction of entrance into said storeroom, and
said hanging bars are associated with said one lane.

* * * * *